US009645022B2

(12) United States Patent
Brummel et al.

(10) Patent No.: US 9,645,022 B2
(45) Date of Patent: May 9, 2017

(54) MAGNETO-ELASTIC FORCE SENSOR AND METHOD FOR COMPENSATING DISTANCE DEPENDENCY IN A MEASUREMENT SIGNAL OF SUCH A SENSOR

(71) Applicant: SIEMENS AKTIENGESELLSCHAFT, München (DE)

(72) Inventors: Hans-Gerd Brummel, Berlin (DE); Uwe Linnert, Fürth (DE); Carl Udo Maier, Stuttgart (DE); Jochen Ostermaier, Erlangen (DE); Uwe Pfeifer, Berlin (DE)

(73) Assignee: SIEMENS AKTIENGESELLSCHAFT (DE)

( * ) Notice: Subject to any disclaimer, the term of this patent is extended or adjusted under 35 U.S.C. 154(b) by 47 days.

(21) Appl. No.: 14/370,563

(22) PCT Filed: Nov. 7, 2012

(86) PCT No.: PCT/EP2012/071978
§ 371 (c)(1),
(2) Date: Jul. 3, 2014

(87) PCT Pub. No.: WO2013/104447
PCT Pub. Date: Jul. 18, 2013

(65) Prior Publication Data
US 2014/0366637 A1    Dec. 18, 2014

(30) Foreign Application Priority Data
Jan. 13, 2012    (EP) .................................... 12151083

(51) Int. Cl.
*G01L 1/12*    (2006.01)
*G01L 3/10*    (2006.01)
*G01B 7/14*    (2006.01)

(52) U.S. Cl.
CPC ................ *G01L 3/105* (2013.01); *G01B 7/14* (2013.01); *G01L 1/125* (2013.01); *G01L 1/127* (2013.01); *G01B 2210/58* (2013.01)

(58) Field of Classification Search
CPC .......... G01M 15/04; G01L 1/12; G01L 1/122; G01L 1/125; G01L 3/10; G01L 3/02;
(Continued)

(56) References Cited

U.S. PATENT DOCUMENTS

| 5,144,846 A | 9/1992 | Klauber et al. |
| 5,195,377 A * | 3/1993 | Garshelis ................ G01L 1/125 |
| | | 324/209 |

(Continued)

FOREIGN PATENT DOCUMENTS

| DE | 93 04 629 U1 | 8/1993 |
| DE | 102006017727 A1 | 10/2007 |
| DE | 10 2009 008 074 A1 | 8/2010 |

OTHER PUBLICATIONS

International Search Report dated Jan. 7, 2013 issued in corresponding International Patent Application No. PCT/EP2012/071978.
(Continued)

*Primary Examiner* — Lisa Caputo
*Assistant Examiner* — Octavia Hollington
(74) *Attorney, Agent, or Firm* — Ostrolenk Faber LLP

(57) ABSTRACT

A magneto-elastic force sensor includes a sensor head (1) that has an emitting coil (9) which generates a magnetic field and at least one magnetic field sensor (11) for measuring a magnetic flux caused by the magnetic field of the emitting coil (9) in a measured object (13). The sensor head (1) also includes a recorder (14) for recording an electrical value that reflects the inductivity of the emitting coil (9) or that is clearly connected to the latter. The magneto-elastic force sensor allows for compensation of a distance dependency in
(Continued)

the measurement signal by ascertaining the distance between the emitting coil (9) or the sensor head (1) and the measured object (13) based on the recorded electrical value and by compensating the distance dependency in the measurement signal based on the ascertained distance.

9 Claims, 1 Drawing Sheet

(58) Field of Classification Search
CPC ....... G01L 5/22; B60G 17/019; G01R 33/096; G01B 7/30; G01N 27/72
USPC .......................................................... 73/779
See application file for complete search history.

(56) References Cited

U.S. PATENT DOCUMENTS

| | | | | |
|---|---|---|---|---|
| 5,297,439 A | * | 3/1994 | Tyren | ...................... G01L 3/102 324/209 |
| 5,565,773 A | * | 10/1996 | Inaguma | .............. G01N 27/725 324/209 |
| 6,073,493 A | * | 6/2000 | Sakamoto | ............ G01N 27/725 324/209 |
| 6,494,102 B2 | * | 12/2002 | Hanisko | .................. G01L 3/102 73/779 |
| 7,034,522 B2 | * | 4/2006 | Gester | .................. G01D 5/2053 324/166 |
| 8,707,793 B2 | * | 4/2014 | Nopper | ................. G01L 9/0004 73/722 |

OTHER PUBLICATIONS

Written Opinion dated Jan. 7, 2013 issued in corresponding International Patent Application No. PCT/EP2012/071978.

European Search Report issued in corresponding European Application No. 12151083 dated Jun. 18, 2012.

European Patent Office Communication dated Oct. 7, 2016 regarding intention to grant a patent in corresponding European Patent Application No. 12 791 125.3 (27 total pages).

\* cited by examiner

MAGNETO-ELASTIC FORCE SENSOR AND METHOD FOR COMPENSATING DISTANCE DEPENDENCY IN A MEASUREMENT SIGNAL OF SUCH A SENSOR

CROSS-REFERENCE TO RELATED APPLICATIONS

The present application is a 35 U.S.C. §§371 national phase conversion of PCT/EP2012/071978 filed Nov. 7, 2012, which claims priority of European Patent Application No. 12151083.8, filed Jan. 13, 2012, the contents of which are incorporated by reference herein. The PCT International Application was published in the German language.

TECHNICAL FIELD

The present invention relates to a magneto-elastic force sensor which can be used, in particular, in a magneto-elastic torsion or torque sensor. In addition, the invention relates to a method for compensating distance dependency in a measurement signal of a magneto-elastic force sensor, which can be used, in particular, as part of a method for determining torsion or torque with the aid of a magneto-elastic force sensor.

TECHNICAL BACKGROUND

The permeability of ferromagnetic materials is influenced by mechanical stresses. This physical effect which is known as the magneto-elastic effect can be used to measure forces which act on an item and cause stresses in this item. For this purpose, the item is provided with a ferromagnetic layer if the item does not itself consist of a ferromagnetic material or does not contain a ferromagnetic layer. Magneto-elastic force sensors can then measure the stresses caused by an acting force using the magneto-elastic effect, the force causing the stresses being able to be determined from the measurement result. Magneto-elastic force sensors based on the magneto-elastic effect can be used, inter alia, to measure torques in a rotating object since a torque generates stresses in the rotating object.

A number of different sensors which use the magneto-elastic effect to contactlessly record torques of shafts, for example, are known. The magneto-elastic sensors are distinguished by a high level of accuracy, in which case recalibration is required just as little as the approaching of reference marks.

A magneto-elastic torque sensor which is used to measure the torque of drive shafts is known from DE 10 2009 008 074 A1, for example. Said document describes a measuring arrangement for recording the torque of a shaft, which arrangement comprises a torque sensor which is positioned at a predetermined gap distance from the surface of the shaft.

In order to measure torques on force-transmitting shafts of machines, an electromagnetic coil is contactlessly arranged at a short distance from the surface of the shaft and reacts to the change in the permeability in a ferromagnetic layer on the shaft or a shaft which is ferromagnetic per se with a signal change. For this purpose, the shaft must be exposed to torsional stresses, that is to say the magneto-elastic torque sensor must be arranged along the shaft between a driving torque and the reaction torque working in opposition to the latter. The shaft formed from the ferromagnetic material is thus part of the measuring apparatus.

If the position of the shaft is changed during measurement, the measurement result which reacts very sensitively to the distance between the sensor and the shaft is influenced by the position changes. Movements by a few tenths of a millimeter perpendicular to the axis of rotation of the shaft already considerably influence the measurement result of the torque sensor. Such position changes of the shaft cannot be eliminated with any economically reasonable technical outlay, in particular in technical applications in which large shafts are used for force transmission.

DE 10 2009 008 074 A1 has therefore proposed the practice of positioning the torque sensor on the shaft using a ring which engages around the shaft. The ring is also connected to a housing section in order to protect it from being concomitantly rotated with the shaft. In this case, the ring is fastened to the housing section in a manner pivotable about a pivot axis and displaceable in the radial direction of the shaft, with the result that it can participate in movements of the shaft. The ring is mounted on the shaft in this case by means of a bearing bushing, sliding shells or ball bearings.

SUMMARY OF THE INVENTION

In the light of the prior art described, a first object of the present invention is to provide an advantageous magneto-elastic force sensor. A second object of the invention is to provide an advantageous torque sensor. According to another aspect of the invention, a third object is to provide a method for compensating distance dependency in a measurement signal of a magneto-elastic force sensor. In addition, a fourth object of the invention is to provide an advantageous method for determining a torque using a magneto-elastic force sensor.

The first object is achieved by means of a magneto-elastic force sensor disclosed herein, and the second object is achieved by means of a torque sensor disclosed herein. The third object is achieved by means of a method for compensating distance dependency in a measurement signal of a magneto-elastic force sensor disclosed herein, and the fourth object is achieved by means of a method for determining a torque disclosed herein.

A magneto-elastic force sensor according to the invention comprises a sensor head having a transmitting coil, which generates a magnetic field, and at least one magnetic field sensor for measuring a magnetic flux caused by the magnetic field of the transmitting coil in a measurement object. In addition, the magneto-elastic force sensor comprises a recording device for recording an electrical variable which represents the inductance of the transmitting coil or is clearly linked thereto, for example the amplitude of the coil voltage. In this case, the recording device may be analog or digital.

In the magneto-elastic force sensor according to the invention, the practice of recording an electrical variable which represents the inductance of the transmitting coil or is clearly linked thereto with the aid of the recording device makes it possible to determine the distance between the transmitting coil—and therefore the sensor head—and the measurement object without the need for an additional distance sensor. In other words, the configuration according to the invention of the magneto-elastic force sensor makes it possible to also use the magneto-elastic force sensor itself as a distance sensor. The unit of the force sensor with the distance sensor makes it possible to avoid error sources which can occur during the installation of an additional distance sensor, for instance angle errors which may be caused by unequal adjustment of the two sensors.

Although it is fundamentally possible to have the recorded electrical variable output and to have the distance externally determined, for example in a connected computer, it is advantageous if the magneto-elastic force sensor also comprises a device for determining the distance between this sensor head and the measurement object from the electrical variable. The magneto-elastic force sensor can then also be used as a pure distance sensor. The device for determining the distance between the sensor head and the measurement object may comprise in this case, in particular, a memory with a stored relationship in which values of the electrical variable of the transmitting coil, which represents the inductance of the transmitting coil or is clearly linked thereto, are related to values for the distance between the transmitting coil or the sensor head and the measurement object. For this purpose, the memory may contain, for example, a look-up table which represents the relationship or may contain a functional relationship in the form of an equation. The device for determining the distance between the sensor head and the measurement object also comprises in this configuration an assignment unit which is directly or indirectly connected both to the recording device and to the memory. The assignment unit assigns a distance between the transmitting coil or the sensor head and the measurement object to the recorded electrical variable using the stored relationship and generates a distance variable representing the assigned distance.

In one advantageous development of the magneto-elastic force sensor according to the invention, the latter also comprises a correction unit which is directly or indirectly connected to the at least one magnetic field sensor and to the assignment unit for receiving the distance variable. The correction unit corrects the measurement results from the at least one magnetic field sensor when measuring a magnetic flux caused by the magnetic field of the transmitting coil in the measurement object using the received distance variable. This configuration makes it possible to compensate distance fluctuations of the sensor head during force measurement without the need for the signal from an additional distance sensor for this purpose.

A torque sensor according to the invention is equipped with at least one magneto-elastic force sensor according to the invention. The problem described at the outset during torque measurement on shafts, in which there is a displacement perpendicular to the axis of rotation, can be overcome with the torque sensor according to the invention by compensating the distance-dependent fluctuations in the measurement signal of the torque sensor. Therefore, there is no need to eliminate position changes of a rotating shaft or to concomitantly move the torque sensor with the shaft movements. As a result, the structure of an arrangement for measuring torque on a shaft is considerably simplified.

Another aspect of the present invention provides a method for compensating distance dependency in a measurement signal of a magneto-elastic force sensor having a transmitting coil, which generates a magnetic field, and at least one magnetic field sensor for measuring a magnetic flux caused by the magnetic field of the transmitting coil in a measurement object. In this case, the measurement signal represents the magnetic flux caused in the measurement object. Within the scope of the method according to the invention, an electrical variable of the transmitting coil, which represents the inductance of the transmitting coil or is clearly linked thereto, is recorded. In this case, the recording can be effected in an analog or digital manner, for example. The distance between the transmitting coil or the sensor head, which carries the transmitting coil, and the measurement object is then determined from the recorded electrical variable. The distance dependency in the measurement signal is then compensated using the determined distance.

The method according to the invention makes it possible to reliably measure the force even in the case of a fluctuating distance between the sensor head and the measurement object without the need for an additional distance sensor for this purpose. Such an additional distance sensor would also require the accurate adjustment of the force sensor and the distance sensor relative to one another, in which case adjustment errors would have a disadvantageous influence on the measurement result from the force sensor. Such adjustment errors cannot occur within the scope of the method according to the invention in which the same measuring head is used to measure the force and to measure the distance. Therefore, the method according to the invention can be used to increase the robustness of a magneto-elastic force sensor during measurement.

The distance between the transmitting coil or the sensor head and the measurement object can be determined from the recorded electrical variable, in particular using a predefined relationship between values of the electrical variable of the transmitting coil, which represents the inductance of the transmitting coil or is clearly linked thereto, on the one hand, and values for the distance between the transmitting coil or the sensor head and the measurement object, on the other hand, the predefined relationship being able to be in the form of a look-up table or algebraic equation, for example.

The predefined relationship between values of the electrical variable of the transmitting coil, which represents the inductance of the transmitting coil or is clearly linked thereto, and the values for the distance between the transmitting coil or the sensor head and the measurement object can be determined by means of a calibrating measurement, for example. Local features at the location of the measurement can also be taken into account in the predefined relationship by carrying out a calibrating measurement.

The method according to the invention for compensating distance dependency in the measurement signal of a magneto-elastic force sensor may be, in particular, part of a method for determining a torque using a magneto-elastic force sensor. The advantages associated therewith have been explained with reference to the magneto-elastic torque sensor according to the invention. Reference is therefore made to the statements made in this respect.

Further features, properties and advantages of the present invention which may be advantageous individually or in combination with one another emerge from the following description of exemplary embodiments with reference to the accompanying figures.

DESCRIPTION OF EMBODIMENTS

A magneto-elastic sensor is based on the inverse magnetostrictive effect, that is to say the effect whereby ferromagnetic materials undergo a change in the magnetic permeability when mechanical stresses occur. Since mechanical stresses are induced by tensile and compressive forces and by torsion, the inverse magnetostrictive effect can be used to measure the force and the torque and can therefore be used in a versatile manner.

Sensor heads for measuring the inverse magnetostrictive effect comprise a transmitting or excitation coil which is used to induce an alternating magnetic field in the ferromagnetic layer. In this case, a response signal is generated in the layer, the magnetic flux density of which signal depends on the permeability of the layer. The latter is in turn determined by the mechanical stresses prevailing in the layer. The magnetic flux density of the response signal is measured using a magnetic field sensor which may be a receiving coil, for example. The magnetic flux density of the response signal then determines the current intensity of the current induced in the receiving coil on account of the magnetic flux density permeating said coil. The mechanical stresses in the ferromagnetic layer can then be calculated from the current intensity, which stresses can in turn be used to determine the force inducing the stresses. Apart from receiving coils, magnetic field sensors based on the Hall effect, magnetic field sensors based on the GMR (Giant Magneto Resistance) effect or magnetic field sensors based on the AMR (Anisotropic Magneto Resistance) effect also come into consideration as magnetic field sensors, for example.

Figure 1:
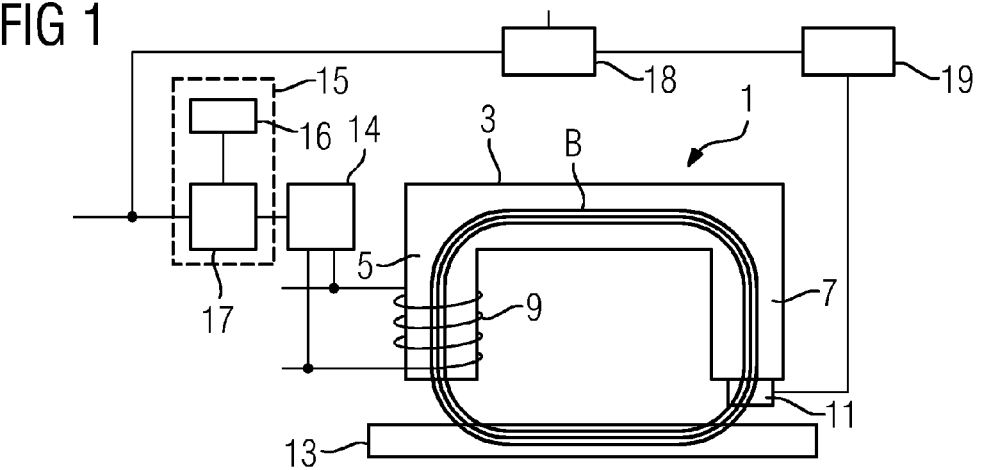
FIG. 1 shows an exemplary embodiment of a magneto-elastic force sensor according to the invention having a U-shaped sensor head.

A first exemplary embodiment of a force sensor according to the invention is illustrated in FIG. 1. The force sensor comprises a sensor head 1 with a U-shaped ferrite core 3 which has two limbs 5 and 7 which are oriented parallel to one another.

A transmitting or excitation coil 9 which can be used to generate a magnetic field is applied to the first limb 5. A magnetic field sensor 11 which, in the present exemplary embodiment, is in the form of a Hall sensor but may also be another of the magnetic field sensors mentioned above is arranged on the second limb 7.

For the measurement operation of the sensor, the transmitting coil 9 is used to generate a magnetic field, the magnetic flux density of which is illustrated by the field lines B in FIG. 1. The field lines run through a ferromagnetic layer 13 of a measurement object and are closed via the ferrite core 3. The layer 13 may be applied to the object to be measured or may be introduced into the object. Alternatively, however, the measurement object itself may also consist of a ferromagnetic material.

The magnetic flux density of the magnetic field can be measured using the magnetic field sensor 11. In this case, the measured value depends on the magnetic permeability in the ferromagnetic layer 13, which is in turn influenced by the stresses prevailing in the ferromagnetic layer. Therefore, the stresses prevailing in the ferromagnetic layer 13 can be calculated from the measurement result obtained for the magnetic flux density using the magnetic field sensor 11. Since the ferromagnetic layer 13 is either the object itself or is connected to the object, the stresses prevailing in the ferromagnetic layer 13 also represent the stresses prevailing in the measurement object.

However, the measured value measured using the magnetic field sensor 11 depends on the distance between the sensor head and the measurement object or the ferromagnetic layer if the measurement object itself is not ferromagnetic. For this reason, the magneto-elastic force sensor comprises a unit 14 for recording the amplitude of the transmitting coil voltage. The unit 14 may be analog or digital, in which case the digital or analog design may depend, in particular, on the subsequent manner in which the recorded signal is processed.

Instead of the amplitude of the transmitting coil voltage, as in the present exemplary embodiment, it is possible, within the scope of the invention, to record another electrical variable which is suitable for representing the inductance of the excitation coil. The distance between the transmitting coil 9 and the ferromagnetic layer 13, that is to say the measurement object, can be determined from the recorded electrical variable, that is to say from the recorded amplitude of the transmitting coil voltage in the present exemplary embodiment. This is because, if the air gap between the measurement object 13 and the sensor head 1 changes, the inductance of the transmitting coil 9 changes without influencing the mechanical stresses in the measurement object. Therefore, an electrical variable representing the inductance of the transmitting coil 9, for instance the amplitude of the transmitting coil voltage, can be used to determine the distance between the transmitting coil 9 and the measurement object. Therefore, the distance between any desired point on the sensor head and the measurement object, in particular also the distance between the magnetic field sensor 11 and the measurement object 13, can be determined from the spatial arrangement of the transmitting coil 9 on the sensor head.

Although the electrical variable recorded using the recording device 14 can be output by the magneto-elastic force sensor and externally processed in order to determine the distance between the sensor head 1 and the measurement object 13, this is carried out, however, in the magneto-elastic force sensor itself in the present exemplary embodiment. For this purpose, the force sensor has a device 15 for determining the distance between the sensor head 1 and the measurement object 13 from the recorded electrical variable. In the present exemplary embodiment, this device 15 comprises a non-transitory memory 16 and an assignment unit 17 which is connected to the recording device 14 and to the memory 16. The memory 16 stores a relationship in which values of the electrical variable (the amplitude of the transmitting coil voltage in the present exemplary embodiment) which represents the inductance of the transmitting coil 9 or is clearly linked thereto are related to values for the distance between the transmitting coil 9 or the sensor head 1 and the measurement object 13. In the present exemplary embodiment, a look-up table is stored for this purpose in the memory 16, which table contains a unique assignment of values for the amplitude of the transmitting coil voltage (or another suitable electrical variable) to values of the distance between the sensor head 1 and the measurement object 13. The table can be created, for example, by calibrating the amplitude of the transmitting coil voltage to the distance between the sensor head 1 and the measurement object 13. This can be effected by recording the respective values of the amplitude of the transmitting coil voltage for a number of distances between the sensor head and the measurement object 13 and storing said values together with the respective distance. This calibration is ideally carried out if there are no stresses in the measurement object 13.

The assignment unit 17 receives the recorded amplitude of the transmitting coil voltage (or, if another electrical variable representing the inductance of the transmitting coil 9 is selected, the recorded value of this variable) from the recording device 14 and determines the distance between the sensor head 1 and the measurement object 13 by assigning a distance to the recorded amplitude value using the look-up table stored in the memory 16. The assigned distance is then output by the assignment unit 17 in the form of a suitable distance variable representing the distance. This variable can be externally output via an output, with the result that the magneto-elastic force sensor can also be operated as a pure distance sensor.

In the present exemplary embodiment, the distance variable is also output to a correction unit 18. In addition to the distance variable, said correction unit also receives a measurement variable which is determined on the basis of the measurement signal from the magnetic field sensor 11 by an evaluation unit 19 connected to the magnetic field sensor 11. The correction unit 18 then corrects the measurement variable using the distance signal and outputs a corrected measurement variable as the measurement result from the magneto-elastic force sensor. Distance dependency of the original measurement variable is then compensated in the corrected measurement variable. The magneto-elastic force sensor is therefore insensitive to fluctuations of the distance between the sensor head 1 and the measurement object 13.

Figure 2:
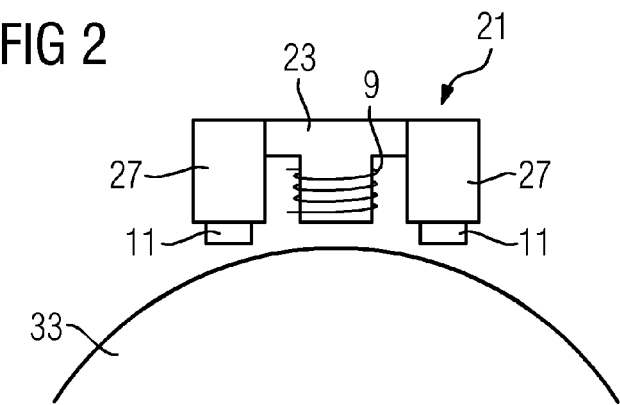
FIG. 2 shows a side view of an exemplary embodiment of a magneto-elastic force sensor according to the invention having a sensor head which has four magnetic field sensors.
Figure 3:
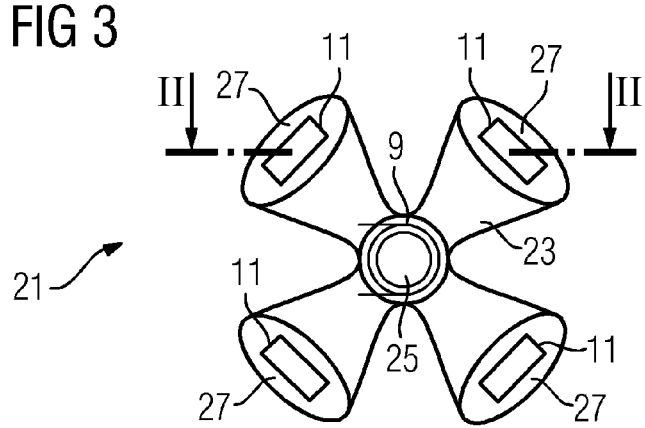
FIG. 3 shows a plan view of the magneto-elastic force sensor from FIG. 2.

A second exemplary embodiment of a sensor head 21 according to the invention and a magneto-elastic torsion or torque sensor constructed with said sensor head is illustrated in FIGS. 2 and 3. Elements which correspond to those in the first exemplary embodiment are denoted with the same reference numerals as in FIG. 1 and are not explained again in order to avoid repetitions. Therefore, the explanation of the second exemplary embodiment is restricted to the differences from the first exemplary embodiment.

In this case, FIG. 2 shows a side view through the sensor head 21 along the line II-II in FIG. 3.

FIG. 3 shows a plan view of that side of the sensor head 21 which is to face the ferromagnetic material.

The sensor head 21 in the second exemplary embodiment has a ferrite core 23 with a central limb 25 and four outer limbs 27 surrounding the central limb 25. The transmitting coil 9 is arranged on the central limb 25. The magnetic field sensors 11 are situated on the outer limbs 27. In the present exemplary embodiment, the geometry of the ferrite core 21 is selected in such a manner that the limbs form two pairs of limbs in which two limbs are each opposite one another on opposite sides of the central limb 25. The two pairs of limbs have an orientation rotated through 90° with respect to one another, with the result that there is point symmetry in the arrangement of the outer limbs 27 with respect to the central limb 25. This configuration of the sensor head 21 makes it possible to record forces in a two-dimensional manner, as is advantageous, for example, for measuring torsion in a shaft 33 or torques of a shaft.

In this case, the shaft 33 may either consist of a ferromagnetic material or may be coated with such a material.

In order to determine the torsion on the shaft 33, the sensor head is oriented with the connecting lines between mutually opposite outer limbs 27 of a pair of limbs along the main forces which occur during torsion and run perpendicular to one another. In the event of torsion, a tensile force prevails in one direction and a compressive force prevails in the direction perpendicular thereto. This means that the magnetic permeability of the ferromagnetic material of the shaft 33 becomes greater in one direction and smaller in the other direction. The geometry of the sensor head 21, as illustrated in FIG. 2 and FIG. 3, can be used to record the permeabilities in the two directions separately from one another, with the result that the torsion of the shaft can be determined from the recorded permeabilities and the tensile and compressive stresses to be calculated therefrom by forming the difference, for example. Since torsion, the magnitude of which depends on the torque, is produced in a rotating shaft on account of the driving torque and the reaction torque working in opposition thereto, the torque causing the torsion can be determined from the recorded torsion.

The sensor head 21 illustrated in FIGS. 2 and 3 is part of a magneto-elastic torsion or torque sensor which, like the electromagnetic force sensor in the first exemplary embodiment illustrated in FIG. 1, has a recording device, a device for determining the distance between the sensor head and the measurement object and a correction unit. The recording device, the device for determining the distance between the sensor head and the measurement object and the correction unit correspond, in terms of their configuration and arrangement, to those from FIG. 1 and are therefore not illustrated in FIGS. 2 and 3 for the sake of clarity.

The present invention has been described for illustration purposes using exemplary embodiments. However, the exemplary embodiments are not intended to restrict the invention, with the result that the scope of protection is restricted only by the accompanying claims. In particular, deviations from the exemplary embodiments illustrated are possible.

For example, instead of the look-up table used in the exemplary embodiments, it is possible to use an algebraic equation in order to assign the measured values for the electrical variable representing the inductance of the transmitting coil to the respective distance values.

As a further modification of the exemplary embodiments shown, it is possible to also arrange a magnetic field sensor, which carries the transmitting coil, on the limb.

The symmetry described with respect to the second exemplary embodiment is advantageous but is not absolutely necessary since the influence of the measurement signals which occurs in a non-symmetrical arrangement can be fundamentally taken into account when processing the measurement signals. In addition, it is also not absolutely necessary for there to be four limbs. Two limbs are sufficient, in particular if the limb which carries the transmitting coil is also equipped with a magnetic field sensor. However, the evaluation of the signals from a sensor head equipped with four symmetrically arranged limbs is easier, in particular if the sensor head has the geometry shown in FIGS. 2 and 3.

The invention claimed is:

1. A magneto-elastic force sensor comprising:
   a sensor head;
   a transmitting coil coupled to the sensor head to generate a magnetic field in the sensor head;
   at least one magnetic field sensor for measuring a magnetic flux caused by the generated magnetic field of the transmitting coil in a measurement object;
   a recording device for recording an electrical variable which represents the inductance of the transmitting coil or is linked to the inductance of the transmitting coil; and
   a device for determining the distance between the sensor head and the measurement object based on the electrical variable, whereby the magneto-elastic force sensor determines a force based on the magnetic field measured by the magnetic field sensor combined with the distance between the sensor head and the measurement object.

2. The magneto elastic force sensor as claimed in claim 1, in which the device for determining the distance between the sensor head and the measurement object comprises:
   a non-transitory memory with a stored relationship in the memory of values of an electrical variable of the transmitting coil, wherein the values represent the inductance of the transmitting coil or is linked thereto, and are related to second values for the distance between the transmitting coil or the sensor head and the measurement object; and an assignment unit connected to the recording device and to the memory and configured and operable to assign a distance between the transmitting coil or the sensor head and the measurement object and the assignment unit is connected to the recorded electrical variable and uses the stored relationship and generates a distance variable representing the assigned distance.

3. The magneto-elastic force sensor as claimed in claim 2, further comprising a correction unit connected to the at least one magnetic field sensor and to the assignment unit and configured for receiving the distance variable and for correcting the measurement results from the at least one magnetic field sensor when the at least one magnetic field sensor is measuring a magnetic flux caused by the magnetic field of the transmitting coil in a measurement object and the correction unit also using the received distance variable.

4. The magneto-elastic force sensor as claimed in claim 1, wherein, the electrical variable which represents the inductance of the transmitting coil or is linked to the inductance of the transmitting coil is the amplitude of the coil voltage.

5. A torsion or torque sensor having at least one magneto-elastic force sensor as claimed in claim 1.

6. A method for compensating distance dependency in a measurement signal of a magneto-elastic force sensor, wherein the sensor comprises a sensor head, a transmitting coil coupled to the sensor head to generate a magnetic field in the sensor head, and at least one magnetic field sensor for measuring a magnetic flux caused by the magnetic field of the transmitting coil in a measurement object;

wherein the measurement signal represents the magnetic flux caused in the measurement object;

the method comprising:

recording an electrical variable of the transmitting coil, which represents the inductance of the transmitting coil or is clearly linked thereto to the inductance of the transmitting coil;

determining the distance between the transmitting coil or the sensor head and the measurement object from the recorded electrical variable;

compensating for the distance dependency in the measurement signal using the determined distance.

7. The method as claimed in claim 6, further comprising determining the distance between the transmitting coil or the sensor head and the measurement object from the recorded electrical variable which is based on a predefined relationship between values of the electrical variable of the transmitting coil, which represents the inductance of the transmitting coil or is linked to the inductance, and values for the distance between the transmitting coil or the sensor head and the measurement object.

8. The method as claimed in claim 7, further comprising determining the predefined relationship between values of the electrical variable of the transmitting coil, which represent the inductance of the transmitting coil or is linked to the inductance, and values for the distance between the transmitting coil or the sensor head and the measurement object by means of a calibrating measurement.

9. A method for determining torsion or torque using a magneto-elastic force sensor, which comprises a method for compensating distance dependency in the measurement signal of a magneto-elastic force sensor as claimed in claim 6.

* * * * *